United States Patent
Mueller et al.

[11] 4,333,607
[45] Jun. 8, 1982

[54] PROPORTIONAL MIX SYSTEM AND METHOD FOR APPLYING A THIXOTROPIC DE-ICING FLUID TO AN AIRCRAFT

[75] Inventors: Wilfred Mueller, Oakland; Donald M. Inghram, Santa Clara; William B. Walker, Los Gatos, all of Calif.

[73] Assignee: FMC Corporation, Chicago, Ill.

[21] Appl. No.: 100,173

[22] Filed: Dec. 4, 1979

[51] Int. Cl.³ .............................................. B05B 1/24
[52] U.S. Cl. .................................... 239/13; 239/131
[58] Field of Search ...................... 244/134 C, 134 R; 239/124, 130, 131, 165, 172, 13; 137/334; 417/223

[56] References Cited

U.S. PATENT DOCUMENTS

| | | | |
|---|---|---|---|
| 2,938,509 | 5/1960 | Carbonero | 417/223 |
| 3,243,123 | 3/1966 | Inghram et al. | 239/124 |
| 4,032,090 | 6/1977 | Trump | 244/134 C |
| 4,073,437 | 2/1978 | Trump | 239/172 X |
| 4,118,151 | 10/1978 | Murakami | 417/223 |
| 4,191,348 | 3/1980 | Holwerda | 244/134 C |

FOREIGN PATENT DOCUMENTS

| | | | |
|---|---|---|---|
| 1266139 | 4/1968 | Fed. Rep. of Germany | 244/134 C |
| 822811 | 11/1959 | United Kingdom | 244/134 C |

*Primary Examiner*—Robert B. Reeves
*Assistant Examiner*—Gene A. Church
*Attorney, Agent, or Firm*—A. J. Moore; R. B. Megley

[57] ABSTRACT

A method and apparatus is disclosed for de-icing aircraft with hot water alone or with a mixture of hot water and a thixotropic de-icing fluid. The apparatus includes a centrifugal de-icing pump which is driven through a clutch only when de-icing fluid is being used thereby minimizing detrimental shear to the thixotropic fluid which shear causes fluid breakdown and reduction of viscosity. Several flow and pressure responsive controls are provided to control the engaging the disengaging of the clutch.

The de-icing step may be followed by an anti-icing step if needed.

26 Claims, 2 Drawing Figures

U.S. Patent   Jun. 8, 1982   Sheet 1 of 2   4,333,607
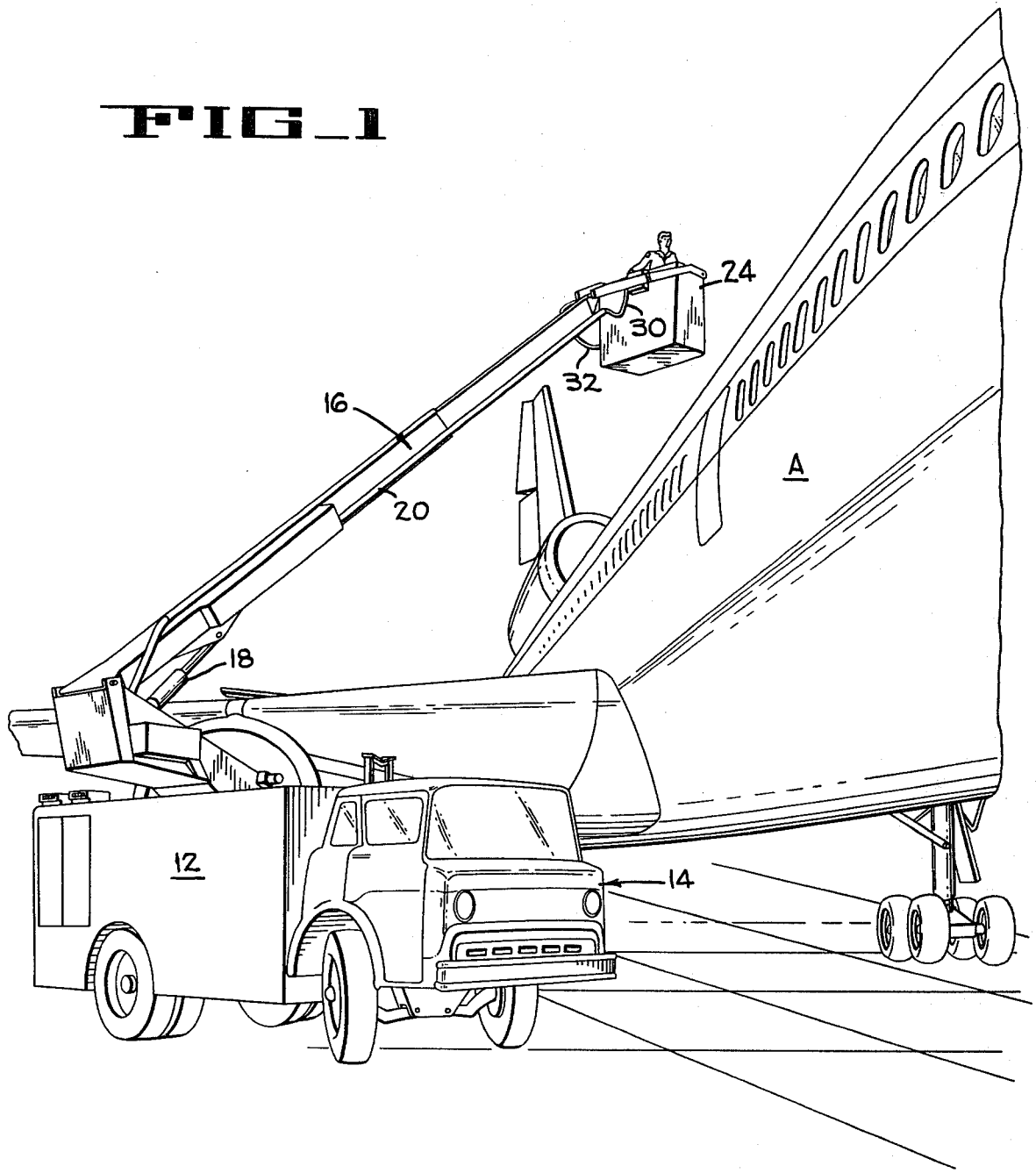

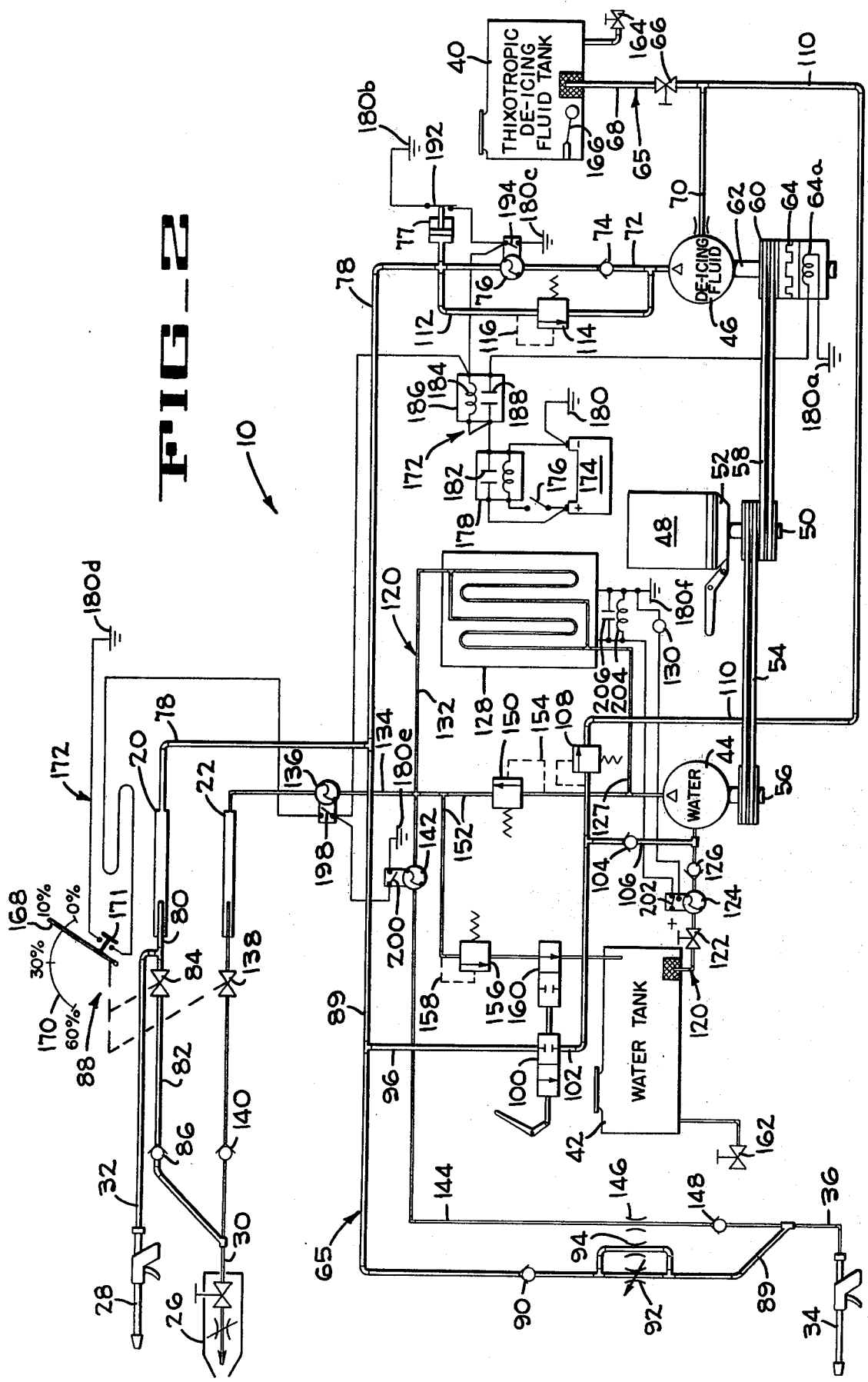

PROPORTIONAL MIX SYSTEM AND METHOD FOR APPLYING A THIXOTROPIC DE-ICING FLUID TO AN AIRCRAFT

BACKGROUND OF THE INVENTION

1. Field of the Invention

The present invention relates to on the ground aircraft de-icers and methods, and more particularly relates to a de-icer having a proportional mix system for applying a thixotropic de-icing fluid and hot water during de-icing to the aircraft surfaces and for applying the thixotropic fluid to the surfaces during anti-icing with a minimum loss of viscosity due to pumping and overheating of the thixotropic fluid.

2. Description of the Prior Art

The use of thixotropic de-icing fluids in an aircraft de-icer is known in the art. British Pat. No. 822,811 which was published on Nov. 4, 1959 discloses an aircraft de-icer that includes a de-icing fluid tank for a hot dilute glycol and water mixture used for de-icing, and another tank for a supply of hot concentrated de-icing fluid for anti-icing the aircraft. The patentee specifies the use of a Kilfrost de-icing jelly or other forms of de-icing fluids. The patentee, however, heats the de-icing fluid in both tanks, and also provides an agitating pump for circulating the water de-icing fluid mixture in the large tank. A single pump and certain control valves are used for spraying both the hot water/de-icing fluid mixture, and the hot concentrated anti-icing fluid onto the aircraft during the de-icing and anti-icing treatments.

German Pat. No. 1,266,139 which issued to SchulzeEckel on Apr. 11, 1968 covers a proportioning valve for an aircraft de-icer which may be adjusted during operation to provide a water and de-icing fluid mixture having anywhere between zero to one-hundred percent glycol. The de-icing mixture includes any commercial de-icing fluid of different viscosities, and such fluids are used either when hot or cold but preferably when heated. The apparatus includes a water tank and a glycol tank with either one or two piston pumps which lead from their supply tanks to a mixing tank adjacent one or more spray nozzles. The strokes of the piston pumps are said to be adjustable individually between zero and one-hundred percent during operation.

U.S. Pat. No. 4,032,090 which issued to Thornton-Trump on June 28, 1977 discloses a method of using hot water alone, or using a mixture of hot water and glycol, depending on the atmospheric conditions, for de-icing an aircraft. The de-icing liquid solution is heated to about 160° F. to 190° F., and when glycol is used in the de-icing fluid, its maximum percentage is up to only about ten percent glycol. When anti-icing is required, the percentage of glycol in water is up to about thirty percent.

U.S. Thronton-Trump Pat. No. 4,073,437 which issued on Feb. 14, 1978 discloses a conversion unit that is secured to the rear end of an aircraft de-icer. The patent discloses a water tank, a water pump on the de-icer, and a nozzle on the de-icer all of which communicate with a heater on the conversion unit through a first water conduit. A glycol tank, proportioning valve, and the nozzle on the de-icer communicates with a glycol pump on the conversion unit by a second or glycol conduit. The conversion unit permits the de-icer to direct hot water alone or a hot water-glycol mix onto an aircraft depending upon the setting of the proportioning valve. When the de-icing/anti-icing operations are completed, the water lines and water pump are purged through a purge line which communicates with the glycol conduit near the suction side of the pump and with the water conduit between the water pump and water tank.

Assignee's U.S. Pat. No. 3,243,123 which issued to Inghram et al on Mar. 29, 1966 discloses a conventional de-icer with several pumps and fluid supply tanks.

SUMMARY OF THE INVENTION

In accordance with the present invention, a proportional mix system and method of operation is provided for a de-icer which applies hot water alone or hot water and a thixotropic de-icing fluid mix to the aircraft during de-icing; and if needed applies a film of undiluted thixotropic de-icing fluid to the appropriate surfaces of the aircraft skin if additional icing is expected before the aircraft leaves the ground.

Although the proportional mix system is capable of handling less viscous de-icing fluids such as glycol, it will be understood that the more viscous thixotropic de-icing fluids, such as Kilfrost ABC, must be handled differently than the less viscous de-icing and anti-icing fluid such as glycol for best results.

It has been determined that thixotropic de-icing fluids have poor resistance to shear, which shear occurs if the fluid is circulated excessively such as when being continuously pumped through a by-pass circuit or the like when the spray nozzle is closed. It has also been determined that heating the thixotropic de-icing fluid to about 140° F. or above also contributes to its breakdown. Breakdown of the fluid by excessive circulation and/or heating lowers it's viscosity and also causes other types of fluid breakdown that are not fully understood.

The primary affect of breakdown of the thixotropic de-icing fluid is that the de-icing fluid will not cling to the sloping sprayed surfaces of an aircraft to provide the desired protective cover for a sufficient period to prevent subsequent icing, but will run off the surfaces sooner than desired. Under atmospheric conditions which require the use of a mixture of hot water and a thixotropic fluid; and/or under more severe conditions when it is necessary to follow the de-icing step with anti-icing using a fine spray of thixotropic fluid, it is desirable that the de-icing fluid remain on the inclined surfaces as well as generally horizontal surfaces for long periods such as eight to ten hours. Such desired results are obtained by the apparatus and method of the present invention under certain atmospheric conditions.

BRIEF DESCRIPTION OF THE DRAWINGS

FIG. 1 is a perspective of a de-icer shown in operative position for de-icing and/or anti-icing an aircraft with the proportional mix system of the present invention.

FIG. 2 is a diagrammatic electrical and fluid circuit diagram illustrating the proportional mix system with the thixotropic de-icing fluid conduits being illustrated in thick double lines, the water conduits being illustrated as thin double lines and the electrical circuit being single lines.

DESCRIPTION OF THE PREFERRED EMBODIMENT

The proportional mix system 10 (FIG. 2) of the present invention is mounted within a housing 12 on a well known mobile vehicle 14 which supports an extendable boom 16 for rotation about a vertical axis. A hydraulic cylinder 18 raises and lowers the boom, while another hydraulic cylinder (not shown) extends and retracts the boom. Long telescopic means in the form of fluid-tight slip tubes or trombones 20,22 (FIG. 2) extend and retract with the boom through a range of about 12 feet and define extendable portions of the de-icing fluid and water conduits, respectively. An operator's basket 24 is mounted on the free end of the boom 16 and has a large 0–120 GPM (gallons per minute) adjustably spray de-icing nozzle 26 (FIG. 2) pivoted to the basket for universal movement, and a smaller hand held 0–30 GPM adjustable nozzle 28. Both nozzles 26 and 28 are included in the system 10 and receive fluid from flexible hoses 30,32 included in the proportional mix system 10 for discharge onto an aircraft A. A small handheld ground nozzle 34 having a capacity of 0–30 GPM is likewise included in the system and receives fluid from a long flexible hose 36 that is preferably mounted on a reel (not shown). Except for the proportional mix system 10, all of the above components are well known in the art, and certain of these components are similar to those illustrated in the above mentioned Inghram et al U.S. Pat. No. 3,243,123 which is incorporated by reference herein.

The proportional mix system 10 (FIG. 2) of the preferred embodiment comprises a tank 40 for holding a supply of thixotropic de-icing fluid, a water tank 42 for holding a supply of water, a centrifugal water pump 44, a centrifugal de-icing fluid pump 46, and an engine 48 having its output shaft (not shown) connected to a drive shaft 50 when a mechanical clutch 52 is engaged. A water pump belt drive 54 drivingly connects the drive shaft 50 to the shaft 56 of the water pump 44. A de-icing fluid pump belt drive 58 connects the drive shaft 50 to an idler pulley 60 journaled on the input shaft 62 of the de-icing fluid pump 46. The de-icing fluid pump is driven only when an electric clutch 64 couples the idler pulley 60 to the input shaft 62 of the de-icing fluid pump 46. The illustrated clutch is a spring released clutch, which clutch must be electrically engaged to drive the de-icing fluid pump 46 when an electrical coil 64a is energized.

A de-icing fluid discharge system 65 is illustrated in wide double lines in FIG. 2 and will now be described.

With the de-icing fluid pump 46 in operation, the pump draws fluid from the tank 40 past an open service valve 66 in conduit 68 and into the pump 46 through conduit 70. The output of the pump 46 directs the fluid through conduit 72, through check valve 74 and through a de-icing fluid flow switch 76 which closes when the flow is at or above the rate of about three gallons per minute. If the pressure in conduit 72 exceeds about 90 psi, it actuates and opens a normally closed pressure switch 77. When one or both of the nozzles 26,28 are open, the de-icing fluid flows into the extendable slide tube trombone 20 from branch line 78 and out of the trombone 20 through the conduit 80 which splits into two branches. One branch communicates with the flexible hose 32 and the hand held nozzle 28. The other branch 82 includes one proportioning valve 84 and a check valve 86, which communicates with the flexible hose 30 and the large nozzle 26. The proportioning valve 84 forms a part of a proportional mix valve assembly 88 and when fully closed permits substantially 100% hot water to be discharged from nozzle 26.

De-icing fluid is also supplied to the ground nozzle 34 through conduit 89 having a check valve 90 and a 3–30 gallon per minute variable flow restrictor or proportioning valve 92 therein. A two and one-half gallon per minute fixed flow restrictor valve 94 is connected in parallel across the valve 92 with the conduit 89 directing its de-icing fluid to the ground nozzle 34 through the flexible hose 36.

When de-icing or anti-icing operations are completed, water must be purged from the water pump 44 and water lines by forcing water out of their components and replacing the water with de-icing fluid as will be fully explained later. The de-icing fluid used for purging water flows from conduit 89, into a conduit 96 having a purged valve 100 therein which is illustrated in position blocking flow therepast but is shifted to a position allowing fluid to flow therethrough into conduit 102 during purging. De-icing fluid flows from conduit 102 past check valve 104 and into the water system through conduit 106 for purging water therefrom as will be described. When the pressure in conduit 102 exceeds about 50 psi, it opens a pilot pressure operated relief valve 108 and flows through conduit 110 which is connected to conduits 68 and 70 adjacent the inlet end of the de-icing fluid pump.

In order to prevent hydraulic locking which would prevent the boom from retracting when all nozzles are closed, a branch conduit 112 is connected in parallel across the flow control switch 76 and check valve 74. The conduit 112 has a relief valve 114 therein which is opened by a pressure of about 275 psi entering pilot line 116 thus preventing the boom to be hydraulically locked by de-icing fluid when all nozzles are closed.

A water discharge system 120 receives water from the water tank 42 which is drawn by the water pump 44 from the tank 42 through a service valve 122, through a low level flow switch 124, and past a check valve 126. The centrifugal water pump provides up to about 120 gallons per minute at 200 psi and directs the water through a conduit 127 into and through a 3,000,000 British thermal unit per hour water heater 128. The water heater 128 heats the water to an operating temperature between about 120° F. and 180° F. If the low level flow control switch 124 senses that the tank is empty or the water level in the tank 44 is low, it turns off the heater 128 and turns on a red warning light 130.

The hot water from the heater 128 flows through conduits 132 and 134, through a flow switch 136 which closes if the rate of flow is about three gallons per minute or more. The hot water then flows into and through the slip tube trombone 22, through a second ball valve 138 of the proportional mix valve 88, through a check valve 140 and mixes with the cooler thixotropic de-icing fluid from conduit 82 (if the de-icing fluid is being used), prior to being discharged from the nozzle 26 onto the aircraft to de-ice the aircraft.

If the lower nozzle 34 is to be used to de-ice portions of the aircraft, hot water from conduit 132 flows through flow switch 142 which closes when about three gallons per minute or more flow through the switch 142. The hot water then flows through conduit 144, fixed flow restrictor valve 146, past check valve 148, and mixes with the cooler de-icing fluid prior to being discharged against the aircraft by the lower nozzle 34.

In the event all nozzles 26,28 and 34 are closed, and the water pump 44 is running, the pumped water is initially blocked from flow by a 60 psi relief valve 150 in by-pass conduit 152. When the pressure in pilot line 154 is at 60 psi or above, relief valve 150 opens directing water to adjustable relief valve 156 which when closed bleeds about three gallons per minute therethrough. The relief valve 156 opens when the pressure in the conduit 152 and pilot line 158 reaches a preset pressure between about 150 and 200 psi. The water then flows through a valve 160 for return to the water tank 42. It will be appreciated that opening of relief valve 156 also prevents hydraulic lock of the water system when all nozzles are closed and the boom and slip tube trombone 20,22 are retracted.

As previously mentioned, water must be purged from the water discharge system 120 to avoid freezing after the de-icing and/or anti-icing operations have been completed and the de-icer is shut down. This purging of water is accomplished by shifting de-icing fluid purge valves 100 and 160 into open and closed positions, respectively. With the nozzles 26 and 34 open, the purging de-icing fluid from conduit 106 then forces the water out of; the water pump 44, the conduit 127 which extends into and through the water heater 128, conduits 132 and 134, slip tube trombone 22, valves 138,140 and then flows out of the nozzle 26. When de-icing fluid is seen discharging from the nozzle 26, the nozzle is closed and the operator knows that the fluid within these components is de-icing fluid which will not freeze.

The de-icing fluid likewise purges water from the flow switch 142, conduit 144 for flow out of the system past resistor valve 146, check valve 148 and out of the nozzle 34 which is closed when the de-icing fluid is seen discharging from the nozzle 34. Any water remaining in the water tank 42 is drained by opening a valve 162; and, when desired, the thixotropic de-icing fluid may be drained from the tank 40 by opening the valve 164. A low level switch 166 in the de-icing fluid tank 40 is connected to a warning light and power source (not shown) which indicates when the thixotropic level is low and should be replenished.

The proportional mix valve 88 includes the two proportioning valves 84 and 138 which are connected to a control lever 168 which is pivoted adjacent a quadrant 170 that is marked in approximate percentages of de-icing fluid in the fluid mixture that will be directed against the aircraft by the large nozzle 26. As shown in FIG. 2, the approximate percentages of thixotropic de-icing fluid in hot water is illustrated as 0%, 10%, 30%, and 60%. It will be understood that the percentages are not exact but indicate the approximate percent of de-icing fluid in the fluid mixture that is applied to the aircraft. It will be apparent that the movement of the handle 168 in a direction which tends to close one valve 84,138 will simultaneously tend to open the other valve 138,84 to maintain a mixture of de-icing fluid and water that is approximately the percentage indicated opposite the setting of the control lever 168. When the lever 168 is at 10% or less, it contacts and opens a normally closed switch 171 of an electrical control circuit 172 for a purpose to be described later. When the lever 168 is at 0% it closes valve 84 thus permitting hot water de-icing of the aircraft with no de-icing fluid therein.

The variable flow restrictor valve 92 in the de-icing fluid conduit system associated with the ground nozzle 34 is manually controlled to provide a desired amount of de-icing fluid to the hot water that is sprayed on the aircraft by personnel on the ground. If the adjustable restrictor or proportioning valve 92 is fully closed, the by-pass flow restrictor 94 assures that about 2½ gallons per minute of de-icing fluid will be mixed with water when the ground nozzle 34 is opened.

An important feature of the invention is the provision of the electrical control circuit 172 which will cause immediate and reliable disengagement of the clutch 64, thus stopping the de-icing pump 46, when continued driving of the pump would cause detrimental shear to the thixotropic de-icing fluid. The control circuit 172 is responsive to the pressure and rate of flow of the de-icing fluid in the de-icing discharge system 65 by means of the pressure switch 77 and the flow switch 76. The control circuit 172 also responds to the flow of water in the water discharge system 120 by means of flow switches 136 and 142, and also by the position of the control lever 168 of the proportional mix valve 88.

The electrical control circuit 172 preferably receives 12 volt direct current from a battery 174 which is charged by the usual engine driven generator (not shown). The circuit 172 includes a master switch 176 which when closed starts the engine 48 through conventional engine circuits. Upon engaging the mechanical clutch 52, the engine 48 drives the water pump 44 and provides power to drive the de-icing fluid pump 46 when the electric clutch 64 is engaged. Closing of the master switch 176 also energizes the coil of a master relay 178 which completes its circuit to ground 180 thereby closing master relay contact 182 directing current to the coil 184 of clutch relay 186. If clutch relay coil 184 is energized, relay contact 188 closes thereby energizing clutch coil 64a. In the preferred illustrated embodiment such energization is accomplished by grounding the circuit as at 180a. Energization of clutch coil 64a engages the clutch 64 thus driving the de-icing fluid pump 46.

The clutch relay coil 184 is energized to engage the clutch 64 in response to several different and independent conditions. When the clutch coil 64a is de-energized, the clutch 64 is disengaged thus stopping the de-icing fluid pump 46 to minimize shear damage to the thixotropic de-icing fluid. If the pressure in the de-icing fluid discharge system 65 is below about 90 psi, as occurs during start up, pressure switch 77 closes its electrical switch contact 192 which completes the circuit to ground 180b energizing clutch coil 64a and thereby engaging the clutch 64 to drive the de-icing fluid pump 46. When the pressure in the de-icing discharge system 65 exceeds about 90 psi, switch contact 192 opens thus de-energizing clutch coil 64a and disengaging clutch 64 provided another control circuit (to be described) does not engage the clutch relay coil 64a.

When the rate of flow of de-icing fluid through flow switch 76 is below about three gallons per minute, flow switch contact 194 remains open and thus the spring released clutch will remain disengaged and will not drive the de-icing pump 46 provided another control means such as the contact 192 of pressure switch 77 is not closed. When flow through the flow switch exceeds about three gallons per minute, the switch contact 194 of flow switch 76 closes to ground 180c thus engaging the clutch 64 and driving the de-icing fluid pump 46.

When the water flow through upper flow switch 136 in the water circulation system 120 is less than about three gallons per minute, switch element 198 remains open thus clutch 64 remains disengaged provided one of the other switches does not close and engage the clutch 34. If the flow of water through flow switch 136 is greater than about three gallons per minute and if the lever 168 of the proportional mix valve assembly 88 is positioned at a de-icing fluid percentage that is above about 10%, by-pass switch 171 closes. Closing of both switch 171 and switch 198 completes the circuit to ground 180d and energizes clutch relay coil 184 which engages the clutch 64 through previously described circuits.

If the lever 168 of the proportional mix valve assembly 88 is approximately at the 10% mark, the by-pass switch 171 is opened thus breaking the circuit to ground 180d preventing the flow switch 136 from energizing the clutch coil 184 regardless of the flow rate of water through the flow switch 136. However, flow or pressure conditions in other conduits may cause energization of the clutch coil 64a and result in driving the de-icing fluid pump 46 when switch 171 is open.

The lower flow switch 142 closes its switch contact 200 to ground 180e when water flows therethrough at a rate in excess of about three gallons per minute thereby energizing clutch relay coil 184 and clutch coil 64a which engages the clutch 64 and drives the de-icing fluid pump 46. When the flow of water through lower flow switch 142 is less than about three gallons per minute, the switch contact 200 of flow switch 142 opens thus disengaging the clutch and stopping the de-icing pump 46 unless the clutch 64 is engaged through another portion of the control circuit.

The low water level flow switch 124 maintains its switch contact 202 closed if sufficient water is present in the water tank 42 thereby closing a circuit through relay coil 204 to ground 180f which closes relay contact 206. Closed relay contact 206 permits heat energy to be applied to the water heater 128 in a conventional manner. When the water level in water tank 42 is low or the tank is empty, the flow through flow switch 124 opens switch contact 202 thus turning off the water heater, and closes a circuit to the "low water" warning light 130.

It has been determined that the amount of shear damage to the thixotropic de-icing fluid caused by a centrifugal pump is much less than that caused by a positive displacement, such as a piston type pump having the same pressure head and capacity ranges. Thus, the pump 46 is preferably a centrifugal pump having a 0–120 gallon per minute capacity and a pressure head of about 200 psi.

It will be understood that the specific ranges of flow rates, pump pressures and capacities, and the heating capability of the heater all relate to the illustrated preferred embodiment of the invention and that other ranges may be used and will fall within the scope of the invention.

Although the operation of the proportional mix system for applying a thixotropic de-icing fluid to an aircraft has been covered with the above description of the components, the effect of opening and closing the nozzles 26, 28 and 34, and the effect of varying the position of the control lever 168 of the proportional mix valve 88 will be described to indicate what operator controlled actions cause engagement and disengagement of the electrical clutch 64 of the de-icing fluid pump 46.

With all nozzles 26, 28 and 34 closed, starting of the engine 48 and closing the mechanical clutch 52 initially drives both the water pump 44 and the thixotropic de-icing fluid pump 46. When the pressure acting on pressure switch 76 reaches a predetermined, pre-set pressure of about 90 psi, switch element 192 opens thereby disengaging the electric clutch 64 which stops the de-icing fluid pump 46.

With the proportional mix handle 168 of the proportional mix valve assembly 88 in any position, opening of the anti-icing nozzle 28 will drop the de-icing fluid pressure acting on the pressure switch 77 a sufficient amount to close switch contact 194 engaging clutch 64 and thus driving the de-icing fluid pump 46. If the nozzle 28 is opened enough to allow a preset flow of about three gallons per minute or more through the flow switch 76, switch contact 194 closes thus interlocking the clutch 64 in engaged position driving the de-icing fluid pump 46 irrespective of the pressure acting on pressure switch 77.

When the proportional mix handle 168 is below about the 10% de-icing fluid setting but not at 0%, hot water and a low percent of de-icing fluid will be discharged from the nozzle 26. The pressure in the de-icing fluid discharge system 65 will be above about 90 psi until the nozzle 26 is opened causing the pressure switch 77 to close pressure switch contact 192, thus engaging the clutch 64. When the flow of de-icing fluid is above about three gallons per minute, the flow of de-icing fluid through the flow switch 76 will close switch contact 194 thus providing an electrical interlock across pressure switch 77 and maintains the clutch engaged until the flow rate drops below three gallons per minute and the pressure acting on pressure switch 77 exceeds about 90 psi. When the proportional mix handle 168 is at the 10% or below position, the handle 168 engages and opens switch 171 thus rendering flow switch 142 in the water discharge system 120 ineffective.

It will be appreciated that the pressure in the de-icing system will decrease in response to extension of the boom 16 and slip tube trombones 20, 22. This action may decrease the pressure below about 90 psi in pressure switch 77 so that the clutch 64 will be energized and drive the de-icing pump 46 to fill the expanding trombone 20, but only momentarily.

When the proportional mix handle 168 is above about the 10% position, the handle 168 allows switch 171 to close. When the nozzle 26 is open enough to cause more than about three gallons per minute to flow through the flow switch 136 in the water discharge system 120, switch element 198 will close thereby energizing clutch 64 and driving the de-icing fluid pump 46 to provide substantially the percent of de-icing fluid water mix indicated by the position of the proportional mix valve handle 168. It will be appreciated that at low de-icing fluid settings (for example 15%) a higher volume of liquid flows through water flow switch 136 as compared to that flowing through the de-icing fluid flow control switch 76 thus providing an interlock across de-icing fluid switch element 76 and 77 and preventing undersirable chatter or momentary engagement and disengagement of the clutch 64 due to the slower flow and high pressure in the de-icing fluid.

The ground nozzle 34 operates independently of the position of the proportional mix handle 160. When the nozzle 34 is opened, a flow of water in excess of about three gallons per minute through flow switch 142 closes switch element 200 thus engaging the clutch 64 and driving the de-icing fluid pump 46. When using the ground nozzle 34, the proportion of de-icing fluid hot water is controlled by the operator who adjusts the variable flow restrictor valve 92 as desired. The fixed flow restrictor valve 94 by-passes about 2½ gpm when the nozzle 34 is open.

It will be apparent that after a de-icing and/or an anti-icing operation has been completed; water remaining in water pump 44, water tank 42, heater 128 and the remainder of the water discharge system 120 may freeze if the mobile de-icing vehicle 14 is left idle in freezing temperatures. In order to purge water from the above water handling components, the proportional mix handle 168 may be left in any position but preferably at the 0% position so that completion of water purging can be visually detected when substantially pure de-icing fluid is seen discharging from the nozzles 26 and 34. Purging is initiated by shifting purge valves 100,160 from the illustrated position in FIG. 2 to their other positions. With one or both of the nozzles 26,34 fully opened, the pressure acting on pressure valve 77 will be below about 90 psi and switch element 192 will be closed to energize the clutch 64 and drive the de-icing fluid. The nozzles 26 and 34 will be closed when de-icing fluid is seen discharging therefrom thus indicating that the water has been purged from the water discharge system 120. Opening the ground nozzle 34 will direct de-icing fluid into water conduit 144 to replace the water with anti-freeze, and flow switch contact 200 will be closed at this time to drive the de-icing fluid pump 46 provided three gallons per minute flows through flow switch 142. The tank 42 is drained by opening the valve 162.

From the foregoing description it is apparent that the proportional mix system and method for applying thixotropic de-icing fluid to aircraft includes a clutch for the de-icing fluid pump that is engaged and disengaged in response to several different flow conditions and pressure conditions within the liquid discharge systems. Also, the clutch is operated in response to the proportion of thixotropic de-icing fluid and hot water directed onto the aircraft during de-icing. The control of the de-icing fluid pump minimizes shear and other breakdown of the fluid by driving the de-icing fluid pump only to maintain the de-icing discharge system 65 filled with de-icing fluid at about 90 psi when all nozzles are closed, and to maintain the system 65 filled when the de-icing fluid is being discharged from one or more nozzles. The de-icing fluid is unheated until it mixes with hot water adjacent the associated nozzle.

Although the best mode contemplated for carrying out the present invention has been herein shown and described it will be apparent that modification and variation may be made without departing from what is regarded to be the subject matter of the invention.

What we claim is:

1. An apparatus for applying a de-icing fluid to a vehicle such as an aircraft; which apparatus includes a water tank and a water discharge system including a water pump, a water heater, and at least one discharge nozzle; a de-icing fluid tank and a de-icing fluid discharge system communicating with said nozzle and including a de-icing fluid pump; and power means for driving the pumps: the improvement which comprises clutch means interposed between said de-icing fluid pump and said power means, and control means included in at least one of said discharge systems for engaging said clutch in response to a flow of fluid through said discharge system at a rate in excess of a predetermined flow rate for subsequent discharge out of said nozzle, said one discharge system being said de-icing fluid discharge system, a de-icing fluid flow switch included in said control means for engaging said clutch and driving said de-icing fluid pump when the de-icing fluid flow through said de-icing fluid flow switch and one of said nozzles is above a predetermined value.

2. An apparatus according to claim 1 wherein the de-icing fluid is a thixotropic fluid of the type which has poor resistance to shear resulting in lower viscosity and breakdown if circulated excessively.

3. An apparatus according to claims 1 or 2 wherein said heater raises the temperature of the water to between about 120° F.–180° F. and wherein cold de-icing fluid is directed into the hot water prior to being discharged from said nozzle.

4. An apparatus according to claims 1 or 2 wherein said clutch is an electrically actuated clutch, and wherein said control means is in said de-icing fluid discharge system and includes a flow switch which is responsive to a flow of about three gallons per minute or more through the de-icing fluid discharge system for energizing said clutch and driving said de-icing fluid pump.

5. An apparatus according to claim 1 wherein said de-icing fluid pump is a centrifugal pump.

6. An apparatus for applying a de-icing fluid to a vehicle such as an aircraft; which apparatus includes a water tank and a water discharge system including a water pump, a water heater, and at least one discharge nozzle; a de-icing fluid tank and a de-icing fluid discharge system communicating with said nozzle and including a de-icing fluid pump; and power means for driving the pumps; the improvement which comprises clutch means interposed between said de-icing fluid pump and said power means; and control means included in at least one of said discharge systems for engaging said clutch in response to a flow of fluid through said discharge system at a rate in excess of a predetermined flow rate for subsequent discharge out of said nozzle, said clutch being an electrically actuated clutch, said control means being in said de-icing fluid discharge system and includes a flow switch which is responsive to a flow of about three gallons per minute or more through the de-icing fluid discharge system for energizing said clutch and driving said de-icing fluid pump, said control means also including a pressure switch which maintains the clutch engaged for driving the de-icing fluid pump when the pressure acting thereon is less than a predetermined value, and said pressure switch being responsive to disengage said clutch when the pressure is greater than said predetermined value.

7. An apparatus according to claim 6 wherein said predetermined pressure value is about 90 psi.

8. An apparatus according to claim 6 wherein said pressure switch and said flow control switch operate independently of each other for energizing said clutch and driving said de-icing fluid pump when the pressure is below said predetermined value, or when the fluid passing through the flow switch is greater than about three gallons per minute.

9. An apparatus for applying a de-icing fluid to a vehicle such as an aircraft; which apparatus includes a water tank and a water discharge system including a water pump, a water heater, and at least one discharge nozzle; a de-icing fluid tank and a de-icing fluid discharge system communicating with said nozzle and including a de-icing fluid pump; and power means for driving the pumps: the improvement which comprises clutch means interposed between said de-icing fluid pump and said power means, and control means included in at least one of said discharge means for engaging said clutch in response to a flow of fluid through said discharge system at a rate in excess of a predetermined flow rate for subsequent discharge out of said nozzle, said one discharge system being said water discharge system, a water flow switch included in said control means for engaging said clutch and driving said de-icing fluid pump when the water flow through said water flow switch and one of said nozzles is above a predetermined value.

10. An apparatus according to claim 9 wherein said predetermined value is about three gallons per minute.

11. An apparatus for applying a de-icing fluid to a vehicle such as an aircraft; which apparatus includes a water tank and a water discharge system including a water pump, a heater, and at least one discharge nozzle; a de-icing fluid tank and a de-icing fluid discharge system communicating with said nozzle and including a deicing fluid centrifugal pump; and power means for driving the pumps: the improvement which comprises clutch means interposed between said de-icing fluid pump and said power means, and control means included in both of said discharge systems for engaging said clutch means in response to a flow of fluid through at least one of said discharge systems at a rate in excess of a predetermined flow rate for subsequent discharge out of said nozzle.

12. An apparatus according to claim 11 wherein the de-icing fluid is a thixotropic fluid of the type which has poor resistance to shear resulting in lowered viscosity and breakdown if circulated excessively.

13. An apparatus according to claims 11 or 12 wherein said heater raises the temperature of the water to between about 120° F.–180° F. and wherein cold de-icing fluid is directed into the hot water prior to being discharged from said nozzle.

14. An apparatus according to claims 11 or 12 wherein said water discharge system includes at least one water flow switch which controls engagement of said clutch in response to a flow rate therethrough in excess of said predetermined flow rate, a de-icing fluid flow switch included in said de-icing fluid discharge system which controls engagement of said clutch in response to a flow rate therethrough in excess of said predetermined flow rate, a pressure switch in said de-icing fluid system which engages the clutch in response to a pressure lower than a predetermined pressure and release the clutch when said pressure is above said predetermined pressure, said flow switches and pressure switch being operable independently of each other to engage or disengage said clutch.

15. An apparatus according to claim 14 wherein said predetermined flow rate is about three gallons per minute and said predetermined pressure is about 90 psi.

16. An apparatus according to claim 14 and additionally comprising a proportional mix valve assembly in said water and de-icing fluid discharge systems, adjustment means included in said proportional mix valve assembly indicating the appropriate percent of de-icing fluid added to the hot water prior to discharge from one of said nozzles, another of said water flow control switches measuring the amount of hot water passing therethrough and through said one nozzle, a by-pass switch held open to de-activate said other flow switch in response to said adjustment means being set below a predetermined indicated de-icing fluid percentage, said clutch being engaged to direct a mixture of a low percentage of de-icing fluid in hot water out of said one nozzle when said by-pass switch is open to response to said pressure switch being subjected to less than said predetermined pressure upon opening said one nozzle and thereafter in response to a flow rate in excess of said predetermined rate passing through said de-icing fluid flow switch.

17. An apparatus according to claim 16 wherein said predetermined flow rate is about three gallons per minute and said predetermined pressure is about 90 psi.

18. A method of de-icing an aircraft with an apparatus that includes a water pump and a centrifugal de-icing fluid pump which directs a mixture of water and a thixotropic de-icing fluid onto the aircraft comprising the steps of driving the water pump for pumping the water through a water discharge system which includes a heater and at least one discharge nozzle when a nozzle is open, heating the water, driving the de-icing fluid pump for pumping the thixotropic fluid through a de-icing fluid discharge system for discharge from at least one of said discharge nozzles when a nozzle is open, detecting the flow rate and pressure of the de-icing fluid in said de-icing fluid discharge system, and discontinuing driving the de-icing fluid pump in response to detecting the pressure of the de-icing fluid which is greater than a predetermined pressure.

19. A method according to claim 18 and additionally including the step of driving the de-icing fluid pump for pumping the thixotropic de-icing fluid in response to detecting the flow rate of the de-icing fluid as being greater than a predetermined rate, driving of said de-icing fluid pump in response to said flow rate being effective regardless of the pressure in the de-icing fluid discharge system.

20. A method according to claim 19 and additionally comprising the step of detecting the rate of flow of water in said water discharge system, and activating said de-icing fluid pump in response to the rate of flow of water being greater than a predetermined rate and independent of the pressure and rate of flow of the de-icing fluid.

21. A method according to claim 20 and additionally comprising the step of varying the concentration of de-icing fluid in the water being discharged from one of the nozzles when open.

22. A method according to claim 21 and additionally comprising the steps of indicating the approximate percentage of de-icing fluid in the water, and rendering the step of detecting the rate of flow of water through a nozzle ineffective in response to the indicated percentage of de-icing fluid being below a predetermined percentage, and wherein the de-icing fluid pump is driven in response to lowering of the pressure in the de-icing fluid discharge system below said predetermined pressure or in response to providing a flow of de-icing fluid in excess of said predetermined flow rate.

23. A method according to claim 21 and additionally comprising the steps of indicating the approximate percentage of de-icing fluid in the water, said clutch being engaged in response to the rate of flow of water through one nozzle being above said predetermined rate and in response to the indicated percentage of de-icing fluid being above a predetermined percentage.

24. A method according to claims 18 or 20 wherein the water is heated to between about 120° F. to 180° F.

25. A method according to claims 18 or 20 wherein said predetermined pressure is about 90 psi and wherein said predetermined flow rates of de-icing fluid and of water is about three gallons per minute.

26. A method according to claim 22 wherein the indicated percentage of de-icing fluid is about 10 percent.

* * * * *